US008392046B2

(12) United States Patent
Geyer et al.

(10) Patent No.: US 8,392,046 B2

(45) Date of Patent: Mar. 5, 2013

(54) MONITORING THE FUNCTIONAL RELIABILITY OF AN INTERNAL COMBUSTION ENGINE

(75) Inventors: Dirk Geyer, Maxhütte (DE); Marco Kick, Mintraching (DE); Markus Kraus, Reifenthal (DE)

(73) Assignee: Continental Automotive GmbH, Hannover (DE)

( * ) Notice: Subject to any disclaimer, the term of this patent is extended or adjusted under 35 U.S.C. 154(b) by 1593 days.

(21) Appl. No.: 11/795,465

(22) PCT Filed: Dec. 28, 2005

(86) PCT No.: PCT/EP2005/057189

§ 371 (c)(1), (2), (4) Date: Jul. 17, 2007

(87) PCT Pub. No.: WO2006/079440

PCT Pub. Date: Aug. 3, 2006

(65) Prior Publication Data

US 2008/0140279 A1 Jun. 12, 2008

(30) Foreign Application Priority Data

Jan. 27, 2005 (DE) ......................... 10 2005 003 916

(51) Int. Cl.

*G06F 7/00* (2006.01)

*D06F 19/00* (2006.01)

(52) U.S. Cl. ............. 701/29.1; 701/36; 701/84; 714/48; 714/51; 702/178

(58) Field of Classification Search .................... 701/29, 701/31, 31.6–31.9, 32.7–32.8, 33.1–33.2, 701/34.4, 29.1, 36, 84; 702/185, 182–183, 702/178; 714/48, 47.1, 51

See application file for complete search history.

(56) References Cited

U.S. PATENT DOCUMENTS 3,568,157 A * 3/1971 Downing et al. ............. 710/264

5,594,646 A 1/1997 Itoh et al.

(Continued)

FOREIGN PATENT DOCUMENTS

DE 198 41 260 A1 3/2000

DE 198 41 267 C1 3/2000

(Continued)

OTHER PUBLICATIONS

Bridging design and implementation for a more practical Condition Based Maintenance Plus (CBM+) solution: Embedded vehicle diagnostics on the Mini-Vehicle Computer System (VCS); Zachos, M.P.; Schohl, K.E.; AUTOTESTCON, 2010 IEEE; Digital Object Identifier: 10.1109/AUTEST.2010.5613553; Publication Year: 2010 , pp. 1-7.*

(Continued)

*Primary Examiner* — Cuong H Nguyen

(74) *Attorney, Agent, or Firm* — King & Spalding L.L.P.

(57) ABSTRACT

An internal combustion engine is controlled by a plurality of partially reliability-relevant functional units. Every reliability-relevant functional unit comprises at least one functional module and at least one monitoring module. The monitoring module is separate from the functional module associated therewith and monitors the functioning of the functional module. The control device also comprises a higher order monitoring functional group. The monitoring module has an entry point for communication with the higher order monitoring functional group. When an error is detected, the monitoring module signals the error to the higher order monitoring functional group using the entry point.

10 Claims, 3 Drawing Sheets

U.S. PATENT DOCUMENTS

| | | | | |
|---|---|---|---|---|
| 6,729,844 | B2 * | 5/2004 | Bettencourt | 416/1 |
| 6,850,867 | B2 * | 2/2005 | Haas et al. | 702/182 |
| 7,630,807 | B2 * | 12/2009 | Yoshimura et al. | 701/48 |
| 7,650,209 | B2 * | 1/2010 | Fachinger et al. | 701/31.7 |
| 7,890,233 | B2 * | 2/2011 | Yamada et al. | 701/45 |
| 8,046,137 | B2 * | 10/2011 | Yamada et al. | 701/45 |
| 8,050,836 | B2 * | 11/2011 | Karnjate et al. | 701/70 |
| 2001/0035729 | A1 * | 11/2001 | Graiger et al. | 318/587 |
| 2002/0180618 | A1 * | 12/2002 | Beri et al. | 340/988 |
| 2002/0183911 | A1 * | 12/2002 | Tashiro et al. | 701/48 |
| 2003/0120401 | A1 * | 6/2003 | Bauer et al. | 701/29 |
| 2006/0156073 | A1 * | 7/2006 | Fachinger et al. | 714/48 |
| 2008/0228323 | A1 * | 9/2008 | Laumer et al. | 700/285 |
| 2010/0235055 | A1 * | 9/2010 | Thimar | 701/43 |

FOREIGN PATENT DOCUMENTS

| | | | |
|---|---|---|---|
| DE | 102 30 577 | * | 7/2002 |
| EP | 0 631 213 | A2 | 12/1994 |
| FR | 2 656 439 | A1 | 6/1991 |
| JP | 2004-207997 | * | 7/2004 |
| JP | 2005-021656 | * | 1/2005 |
| WO | WO 00/65218 | A1 | 11/2000 |
| WO | WO 03/056427 | A2 | 7/2003 |
| WO | PCT/EP03/06819 | * | 1/2004 |

OTHER PUBLICATIONS

Building a modular service oriented workflow engine; Sturmer, G.; Mangler, J.; Schikuta, E.; Service-Oriented Computing and Applications (SOCA), 2009 IEEE International Conference on; Digital Object Identifier: 10.1109/SOCA.2009.5410270 Publication Year: 2009 , pp. 1-4.*

Bridging design and implementation for a more practical Condition Based Maintenance Plus (CBM+) solution: Embedded vehicle diagnostics on the Mini-Vehicle Computer System (VCS); Zachos, M.P.; Schohl, K.E.; AUTOTESTCON, 2010 IEEE Digital Object Identifier: 10.1109/AUTEST.2010.5613553; Publication Year: 2010 , pp. 1-7.*

Audio Signature-Based Condition Monitoring of Internal Combustion Engine Using FFT and Correlation Approach: Yadav, S.K. et al; Instrumentation and Measurement, IEEE Transactions on; vol. 60 , Issue: 4; Digital Object Identifier: 10.1109/TIM.2010.2082750; Publication Year: 2011 , pp. 1217-1226.*

Model-based engine fault detection and isolation; Dutka, A.; Javaherian, H.; Grimble, M.J.; American Control Conference, 2009. ACC '09; Digital Object Identifier: 10.1109/ACC.2009.5160245; Publication Year: 2009 , pp. 4593-4600.*

Robust strategy for intake leakage detection in diesel engines; Ceccarelli, R.; Moulin, P.; Canudas-de-Wit, C. Control Applications, (CCA) & Intelligent Control, (ISIC), 2009 IEEE; Digital Object Identifier: 10.1109/CCA.2009.5280962 Publication Year: 2009 , pp. 340-345.*

Fault Detection for Electro-Hydraulic Valve-Controlled Single Rod Cylinder Servo System Using Linear Robust Observer Ming Tingtao; Zhang Yong-xiang; Zhang Xi-yong; Measuring Technology and Mechatronics Automation, 2009. ICMTMA '09. Inter. Conf. on;vol. 1 Digital Object Id.: 10.1109/ICMTMA.2009.189; Pub. Year: 2009 , pp. 639-642.*

* cited by examiner

MONITORING THE FUNCTIONAL RELIABILITY OF AN INTERNAL COMBUSTION ENGINE

CROSS REFERENCE TO RELATED APPLICATIONS

This application is the US National Stage of International Application No. PCT/EP2005/057189, filed Dec. 28, 2005 and claims the benefit thereof. The International Application claims the benefits of German application No. 10 2005 003 916.2 DE filed Jan. 27, 2005, both of the applications are incorporated by reference herein in their entirety.

FIELD OF INVENTION

Monitoring the reliability-relevant characteristics of systems, for example internal combustion engines, is today guaranteed by a level structure, which is mapped to the reliability-relevant scope of functions of the system in the control device. An example is the EGAS (electronic gas pedal) monitoring concept according to the recommendations of the EGAS-AK of the VDA (Association of the German Automotive Industry).

BACKGROUND OF THE INVENTION

Such a purely level-oriented concept is complicated both in the case of software structures, the provision of which is distributed among different software suppliers, and in the case of distributed hardware structures, for example in the case of parallel or redundant structures, in which parts of the reliability-relevant functions are carried out in each case. In addition, the EGAS monitoring concept makes provision for independent hardware for monitoring the processor functions of the computer performing the functions. If different functions are carried out by different control devices, an independent hardware mechanism must be provided for monitoring each of these control devices, which results in considerably higher costs being incurred.

In the case of software structures, it has not yet been possible to satisfactorily resolve the synchronization and enabling or implementation of know-how problems, for example interface definitions for defining the monitoring structure. Distributed hardware structures are not yet being used widely, but will become increasingly important in the course of the so-called AUTOSAR initiative (Automotive Open System Architecture).

The grouping of functions, for example, ignition or injection, is at present undertaken in so-called units. In this way, it is for example possible to group together, in an organized manner, into one group called the DRRQ (driver request), the entire functionality concerned with the capture and the diagnosis of the driver's request via the accelerator pedal. This group also comprises the diagnosis of the gas pedal components. Because the function of capturing the driver's request is a reliability-relevant function, there has thus far been one module in a monitoring functional group concerned with the protection of the functions in the DRRQ unit. If the DRRQ functions are now supplied by another manufacturer as a product (black box) or if these functions are carried out in another control device (e.g. carbody controller), the technical and organizational synchronization of monitoring becomes difficult, if not completely impossible, because there are requirements with respect to time, for example real-time criteria, that may be damaged by an exchange of data between the control devices.

SUMMARY OF INVENTION

An object underlying the present invention is to find a new way in which to synchronize reliability-relevant structures in the face of restrictions on the side of the manufacturer or product-specific restrictions in the case of software development and hardware platforms.

This object is achieved by the inventions by means of the features of the independent claims. Advantageous embodiments of the inventions are described in the subclaims. The wording of all claims is herewith drafted with reference to the content of this description.

According to the invention, a control facility is proposed for a system of an internal combustion engine in particular. The control facility may consist of a plurality of microprocessors, a plurality of individual control devices or a single control device. As a rule it will be referred to below as the "control device".

The control device comprises a plurality of functional units. Every reliability-relevant functional unit comprises at least one functional module and at least one monitoring module. The monitoring module is separate from the functional module and monitors the functioning of the functional module. The control device also comprises a higher-order monitoring functional group. The monitoring module has an entry point for communication with the higher-order monitoring functional group.

The modules can be implemented in hardware or software, perhaps as individual microcontrollers. An entry point can for example form or consist of an interface or program class, which is for example suitable for a parameter transfer or transfer in the sense of a transmission path.

The result is that intrinsically-safe structures are defined in accordance with the structure described above. The greater part of the monitoring is self-implemented by modules in the functional units. These monitoring modules communicate with the higher-order monitoring functional group.

The advantages of the inventive structure lie in the fact that a function as product is now always equipped with the monitoring structures associated therewith. Therefore, it is also possible for a provider of a function to keep secret a great deal of know-how, because said provider defines the monitoring structures himself. It is ensured, that the monitoring function (higher-order monitoring functional group) and the corresponding functions or functional units (e.g. DRRQ) are always synchronized with each other.

Even in the case of distributed hardware, the reliability-relevant functions and the monitoring associated therewith is consistently incorporated in the same hardware. This results in short signal paths between function and monitoring. This makes a rapid response behavior possible, i.e. short latency and high transmission reliability. In addition, should monitoring access to the hardware become necessary, for example an A/D converter or a timer, this is directly possible. This results in significant advantages in the real-time behavior.

The definition of intrinsically-safe functions allows these to be used optimally as far as organizational and technical aspects are concerned. In other words, adaptation losses during the development and hidden interpretation gaps are in particular already avoided in interface definitions, which are connected with the necessary know-how transfer in the case of conventional approaches.

In addition to the initiation of a central error processing or error reaction and its handling in the higher-order monitoring functional group, provision can also be made for the implementation of a structure of distributed error reactions. Thus far, when errors were identified in the engine control device, the error reaction for this facility was initiated globally, for example by switching off output-determining stages resulting in a switched-off engine or driving mechanism. Provision has been made in an advantageous manner that, on the occurrence of an error in one of the distributed control devices, for example in the gas pedal control device, the error information in the higher-order monitoring functional group or in the monitoring module can be evaluated in such a way with the DRRQ function, that only the specific faulty signal, for example, the pedal value, is set at a specific value, for example zero, and that the facility can otherwise be used with the remaining availability.

Furthermore, the reliability-relevant signals, in particular in the case of distributed control devices, can be transmitted in such a way that, for example, initially a transmitter and a receiver are defined for the transmission path between the specific monitoring module and the higher-order monitoring functional group. In addition, a reliable transmission can be defined in such a way that the sending control device for example always takes the responsibility for the reliability of the content of a message, a time stamp, or a measured value. Accordingly, the definition may determine that the receiving control device must in principle protect or check the plausibility of the transmission path. Therefore, the independent DRRQ unit, which for example sends the data content, is subsequently responsible for or authorizes the correctness of the content, for example by a suitable codification or an integrity check. The higher-order monitoring functional group is responsible for the operation of the transmission link, for example, for supplying an internal or an external data bus connection, for the signaling, for adhering to a transmission sequence, a time behavior or for similar functionalities.

Through the definition of intrinsically-safe functions according to the invention, it becomes possible to manufacture reliable functions or software as product in the sense of the Product Liability Act as well as support distributed hardware cells with reliable characteristics, also in the sense of a reliable product.

In addition, the definition of intrinsically-safe functions for example makes it possible to not only place or move a function together with its monitoring structures flexibly within a system, but also to keep these dynamically-relocatable in cross-linked systems even across so-called hardware boundaries, i.e. an engine control functionality can be moved into the transmission control functionality according to, for example, load-dynamic criteria of a network topology, with resources distributed across different areas.

The invention also allows a synchronized and a reliable development for an arrangement with reliability-relevant functions. The time to maturity is reduced and the costs are decreased.

An example of an embodiment of the present invention shows the essential, relevant functional groups of an EGAS engine control and its monitoring on the basis of the definition of intrinsically-safe functions.

The control facility can be structured in a very flexible manner. Provision can be made, in particular, for at least two reliability-relevant functional units, which can be regarded as stand-alone hardware components in each case. This means complete units or only individual functions, including their monitoring modules can be shifted across hardware boundaries. In this way, a distributed control facility is obtained.

The object of the invention is also achieved by a method. The individual procedural steps are described in detail below. The steps need not necessarily be carried out in the given order and the method can also have additional steps which have not been mentioned.

First of all a plurality of functional units are embodied to control the system, in which case the functional units are embodied in such a way that every functional unit contains a functional module and a monitoring module. The functional units are embodied in such a way that the monitoring module is separate from the functional module. A higher-order monitoring functional group is also embodied. The monitoring module has an entry point for communication with the higher-order monitoring functional group. The monitoring module monitors errors of the functional module. The monitoring module signals a detected error to the higher-order monitoring module using the entry point.

The scope of the invention moreover includes a computer program that, when run on a computer or on a plurality of computers of a computer network, executes the method according to the invention in one of its embodiments.

The scope of the invention furthermore includes a computer program with program code means in order to execute the method according to the invention in one of its embodiments when the program is run on a computer or on a plurality of computers of a computer network. The program code means can be stored, in particular, on a data carrier that can be read by a computer.

The scope of the invention in addition includes a data carrier on which a data structure has been stored, which after loading into a working memory and/or main memory of a computer or a plurality of computers of a computer network, can execute the method according to the invention in one of its embodiments.

The scope of the invention also includes a computer program product with program code means stored on a carrier that can be read by a machine in order to carry out the method according to the invention in one of its embodiments when the program is run on a computer or on a plurality of computers of a computer network.

In this case, a computer program product means the program as a tradable product. In principle, it can be provided in any form, in this way for example on paper or a data carrier that can be read by a computer and can be distributed in particular over a data transmission network.

Finally, the scope of the invention includes a modulated data signal, which comprises instructions that can be carried out by a computer system or by a plurality of computers of a computer network in order to execute the method according to the invention in one of its embodiments. Both a stand-alone computer and a network of computers are considered as a computer system, for example, an in-house, closed network or also computers that are connected with one another via the Internet. The computer system can also be realized via a client-server constellation, in which case parts of the invention run on the server and others on a client.

Further details and features of the invention emerge from the following description of preferred exemplary examples together with the subclaims. In this case, the specific features can be implemented on their own or as a number of features in combination with one another. The invention is not limited to the exemplary embodiments.

BRIEF DESCRIPTION OF THE DRAWINGS

The exemplary embodiments are specified in the schematic diagrams. In the individual figures, the same reference characters refer to the same or functionally comparable elements and/or elements that correspond with one another with regard to their functions. The figures show.

DETAILED DESCRIPTION OF INVENTION

Figure 1:
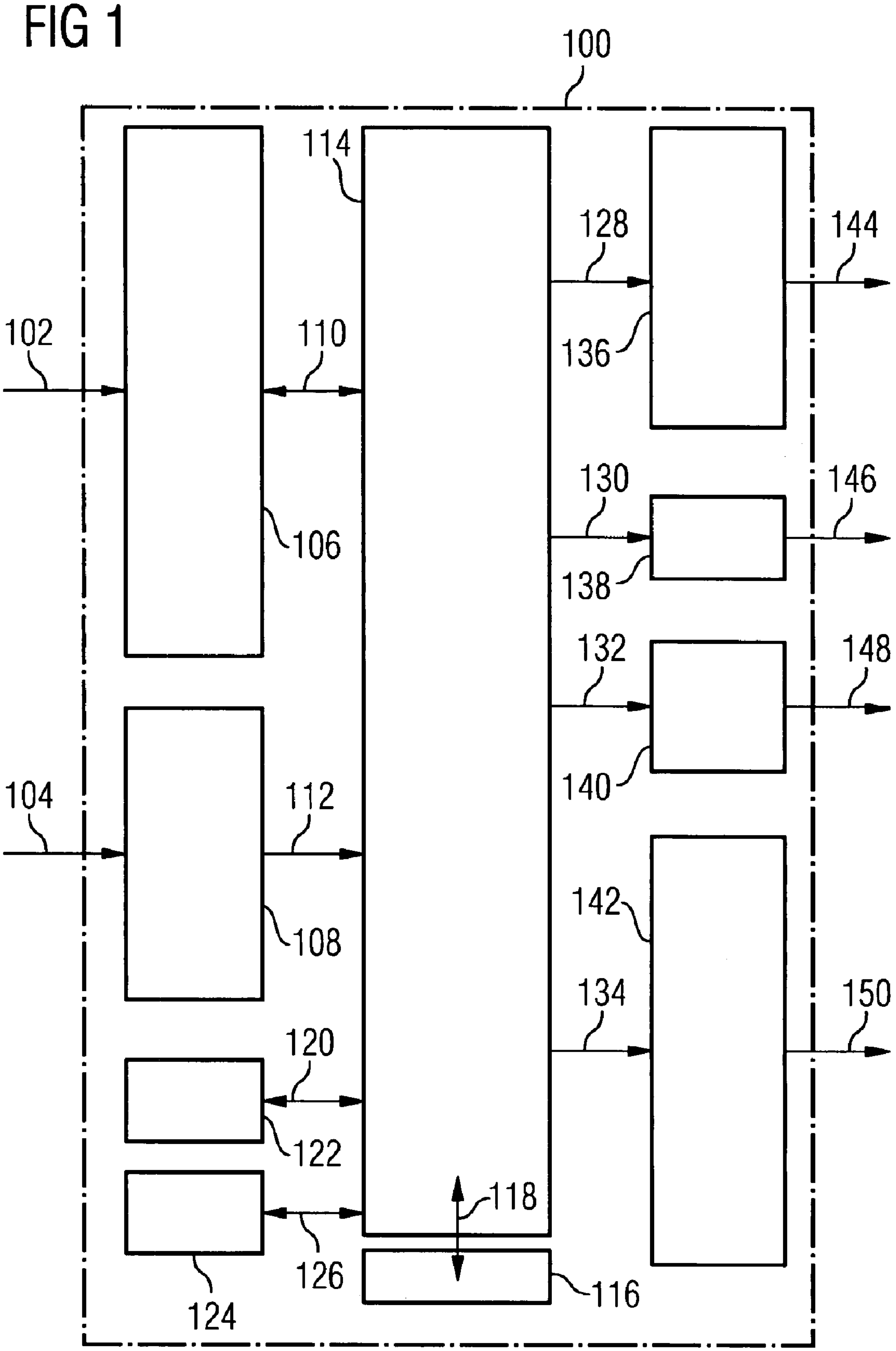
FIG. 1 a schematic diagram of an electronic engine control.

FIG. 1 shows a basic diagram of an engine control 100. In engine control 100, the signal flow 102 flows from the different sensors and set point devices (e.g. accelerator pedal position, throttle valve position, air mass, battery voltage, intake-air temperature, engine temperature, knock intensity, lambda probes) and the signal flow 104 (e.g. crankshaft speed, camshaft position, gear shifting, speed) flows through the input/output ports 106 and 108 and further from the ports via the connections 110 and 112 to the microcontroller 114 and its components. The program that is to be run by the microcontroller 114 is stored in the OTP-block (One-Time Programmable-Block) 116. The data flows between the microcontroller 114 and the OTP block 116 via the connection 118. The data is transferred between the microcontroller 114 and the CAN bus 122 via the connection 120. The CAN bus 122 makes a network possible between all the devices via a single cable. The data is transferred between the microcontroller 114 and a diagnostic system 124 via the connection 126.

The microcontroller 114 with its components implements its functions on the basis of the program stored in the OTP block 116. After the signals from the sensors and the set point devices 102, 104 have been processed in the microcontroller 114, the further signals flow from the microcontroller 114 via the connections 128, 130, 132, 134 and through the input/output ports 136, 138, 140, 142 to the different actuators 144 (e.g. ignition coils and spark plugs), 146 (e.g. throttle valve actuators), 148 (e.g. injection valves) and 150 (e.g. main relay, tachometer, fuel pump relay, lambda probe heating, camshaft control, tank ventilation, intake pipe changeover, secondary air, recycling of exhaust gases).

Because of an increase in the number of their input and output variables, these control functions in motor vehicles are very complex, so that in order to implement these tasks, modern control systems based on the microcontrollers 114 are used.

Because different sensors, of which the measurement data must be taken into account in a timely manner, are increasingly being used in modern motor vehicles, the number of input/output ports 106, 108, 136, 138, 140, 142 of an engine control 100 have continued to increase. That is why microcontrollers 114 with a very high computing power are increasingly being used in which case the functionalities of the control device software can be modified, so that they can be adapted to the specific needs of the different users in an effective manner.

Figure 2:
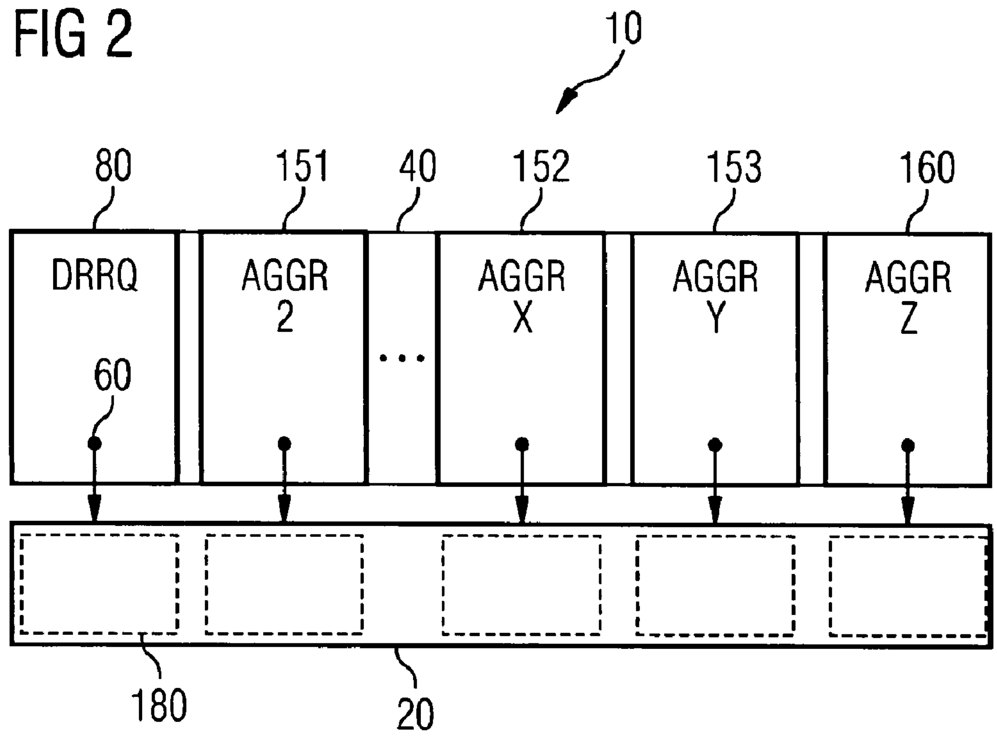
FIG. 2 a section from a first-level model according to the prior art.

FIG. 2 shows a diagram of the area of the control device as a level model 10 according to the prior art.

The level model 10 features a layer 20, namely the monitoring functional group, which performs monitoring functions. On the monitoring layer 20, building upwards, provision has been made for a functional layer 40, which comprises additional modules or units and connects the two aforementioned layers 20 and 40 using entry points such as for example the entry point 60. In this case the entry point 60 can for example represent or comprise an interface or a class of a programming language, which is for example suitable for a parameter transfer or a transfer in the sense of a transmission path. A plurality of transmission paths can be embodied as a channel bundle or a network connection on which the transmission protocols can be applied.

The functional layer 40 carries as a device reliability-relevant functions, which in the embodiment according to the invention for example are a DRRQ unit 80 and a plurality of additional units, in particular a first unit, namely, (AGGR_2) 151 as well as the additional units AGGR_x 152, AGGR_y 153 and AGGR_z 160.

Provision has been made for a plurality of modules in the monitoring layer 20 (shown by of a broken line), for example, a module 180. In this case, the layer 20 carries or comprises the relevant monitoring functions of the DRRQ unit 80 or the other units 151, 152, 153 and 160.

Figure 3:
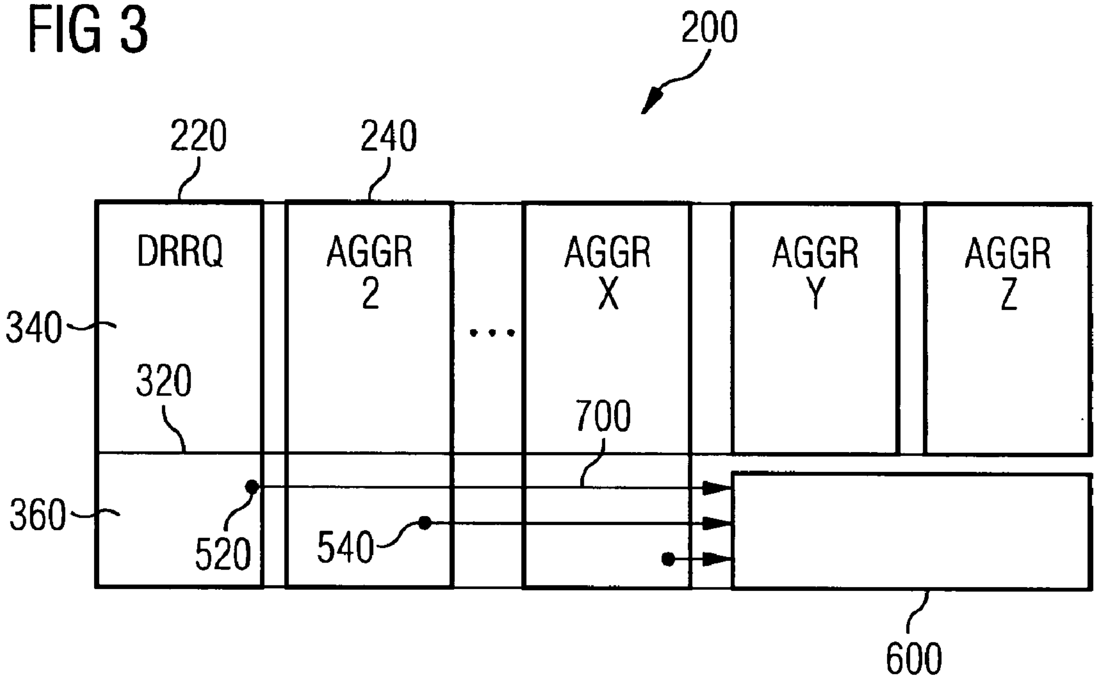
FIG. 3 a second-level model according to a first embodiment of the underlying invention.

FIG. 3 shows the embodiment according to the invention in accordance with a level model 200. Compared with the level model 10 shown in FIG. 2, the DRRQ unit 220 and the AGGR_2 unit 240 selected from a plurality of units are structured in an encapsulated manner so that the modules for the reliability-relevant function and the monitoring function are connected in a block-like manner. In this process, a unit 220 has an internal dividing area 320, which creates a subdivision within the unit between the reliability-relevant function 340 and the monitoring function 360. In addition, in the DRRQ unit 220, as a stand-alone module above the dividing area 320, which is for example embodied as an interface area, a functional module 340 is embodied for reliability-relevant functions and a monitoring module 360 with monitoring functions is embodied below this area.

The DRRQ unit 220 and the plurality of other units further exhibit the special characteristic that at the level of the specific monitoring function there is an entry point in each case, with the entry point 520 have been taken here as an example, by means of which the specific monitoring function of the DRRQ unit 220 or the AGGR_2 unit 240 (using the entry point 540) is fed to the higher-order monitoring functional group 600. In addition, the monitoring functions 360 are coupled to the higher-order monitoring functional group 600 at a few precisely defined points 520, 540.

On an example transmission path 700 formed between the entry point 520 and the higher-order monitoring functional group 600, which can also be provided as a bidirectional path, functional commands and return signals for monitoring the processor functions can be transmitted in addition to the transmission of e.g. error information or secured output values. For this reason, individual protection hardware that carries out the reliability-relevant function is not required in an advantageous manner.

Figure 4:
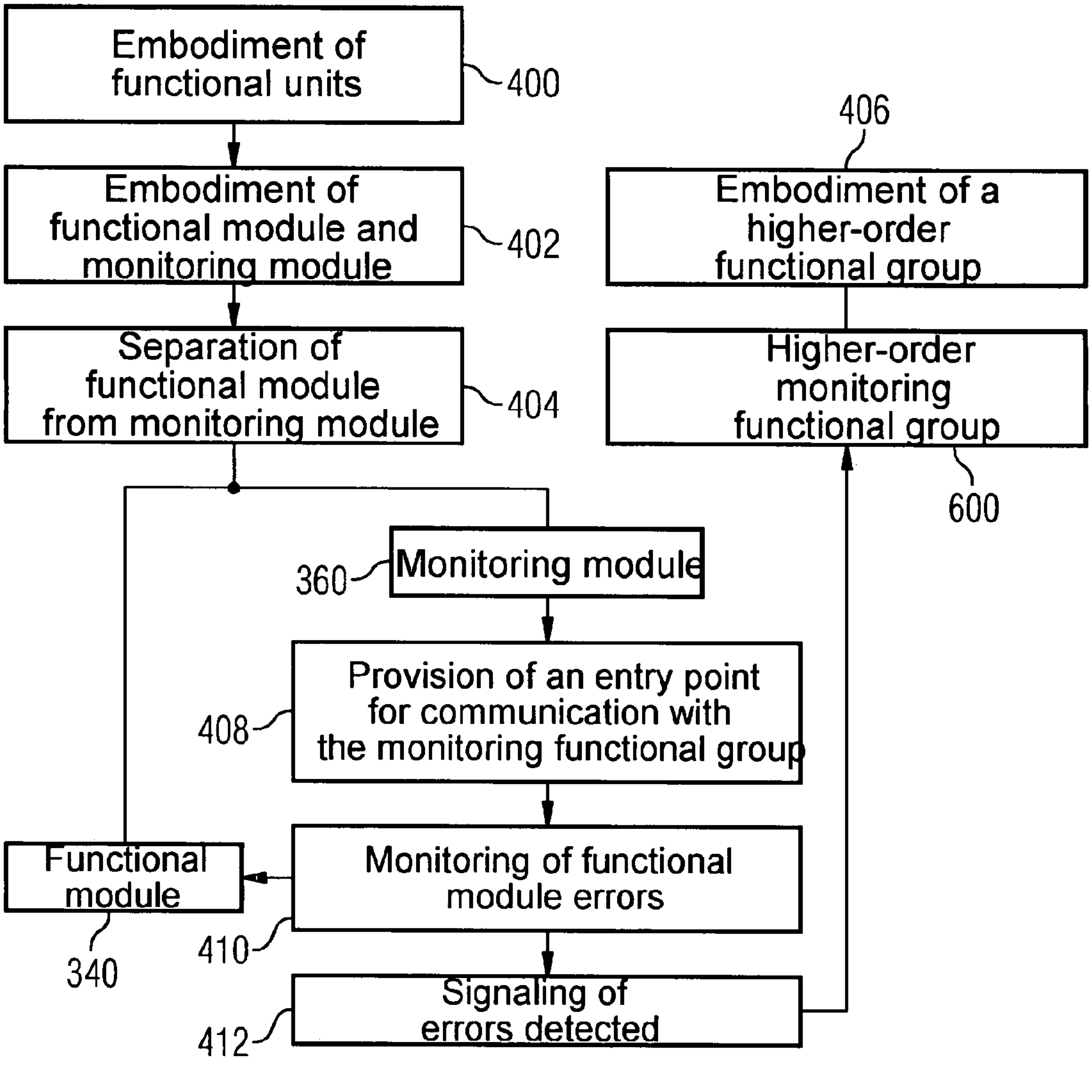
FIG. 4 a basic diagram of the method for monitoring the functional reliability of a system, in particular of an internal combustion engine.

FIG. 4 explains the method. In a first step 400, a plurality of reliability-relevant functional units are embodied to control the system. In a next step 402, the functional units are embodied in such a way that every functional unit comprises a functional module and a monitoring module. In a next step 404, the functional units are embodied in such a way that the monitoring module 360 is separate from the functional module 340. In a next step 406, a higher-order monitoring functional group 600 is embodied. In a subsequent step 408, the monitoring module 360 has an entry point for communication with the higher-order monitoring functional group 600. Errors of the functional module 340 are monitored in a next step 410 by the monitoring module 360. In a next step 412, a detected error is signaled by the monitoring module 360 to the higher-order monitoring module 600 using the entry point.

The invention claimed is:

1. A control device for an internal combustion engine system, comprising:

a plurality of reliability-relevant functional units, wherein each reliability-relevant functional unit has:
at least one functional module, and
at least one monitoring module associated with the at least one functional module,
wherein each at least one functional module is separate from the associated at least one monitoring module, and
wherein the at least one monitoring module is configured to monitor the at least one functional module, and each of the reliability-relevant functional units is computed on stand-alone hardware components;
a higher-order monitoring functional group;
wherein a particular one of the at least one monitoring module is configured to initiate an error processing responsive to detecting modules if an error in the at least one functional module associated with the particular monitoring module, wherein the error processing includes the particular one of the at least one monitoring module communicating with the higher-order monitoring functional group.

2. The control device as claimed in claim 1, wherein a transmission path is between every monitoring module and the higher-order monitoring functional group.

3. The control device as claimed in claim 2, wherein data is transmitted between the stand-alone monitoring module and the higher-order monitoring functional group, wherein the data is selected from the group consisting of an error information, a functional command, and a return signal.

4. The control device as claimed in claim 2, wherein a plurality of transmission paths form a transmission network.

5. The control device as claimed in claim 2, wherein the transmission path extends between a transmitter and a receiver, wherein the transmitter is related to a content of the transmission and the receiver is related to a plausibility check of the transmission path.

6. The control device as claimed in claim 5, wherein the transmitter is a stand-alone monitoring module, and wherein the receiver is the higher-order monitoring functional group.

7. The control device as claimed in claim 1, wherein each monitoring module has a single microcontroller.

8. The control device as claimed in claim 1, wherein the higher-order monitoring functional group is configured for error processing.

9. The control device as claimed in claim 1, wherein at least two reliability relevant functional modules and the monitoring module assigned to the at least two reliability relevant functional modules are each computed on a stand-alone hardware component.

10. The control device as claimed in claim 1, wherein each functional module has a single microcontroller.

* * * * *